US008244119B2

(12) United States Patent
Tanabe

(10) Patent No.: US 8,244,119 B2
(45) Date of Patent: Aug. 14, 2012

(54) IMAGE CAPTURING APPARATUS AND METHOD FOR CONTROLLING THE SAME

(75) Inventor: Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/879,449

(22) Filed: Sep. 10, 2010

(65) Prior Publication Data
US 2011/0064396 A1   Mar. 17, 2011

(30) Foreign Application Priority Data
Sep. 14, 2009 (JP) .................................. 2009-211978

(51) Int. Cl.
*G03B 17/00* (2006.01)
(52) U.S. Cl. ........................................................ 396/49
(58) Field of Classification Search .................. 396/49
See application file for complete search history.

(56) References Cited

U.S. PATENT DOCUMENTS

| 2005/0021340 | A1* | 1/2005 | Steinbiss ....................... 704/273 |
| 2006/0274949 | A1* | 12/2006 | Gallagher et al. ............ 382/228 |
| 2009/0135269 | A1* | 5/2009 | Nozaki et al. ............. 348/222.1 |
| 2010/0302393 | A1* | 12/2010 | Olsson et al. ............. 348/222.1 |

FOREIGN PATENT DOCUMENTS
JP    2002-057928 A    2/2002

* cited by examiner

*Primary Examiner* — Rodney Fuller
*Assistant Examiner* — Fang-Chi Chang
(74) *Attorney, Agent, or Firm* — Canon USA Inc. IP Division

(57) ABSTRACT

An image capturing apparatus including an image capturing unit configured to obtain an image by image capturing includes a first storage unit configured to store face information of an owner of the image capturing apparatus, an estimation unit configured to estimate a photographer of the image capturing apparatus based on a relationship between an object included in the image obtained by the image capturing unit and the face information of the owner stored in the first storage unit, and a change unit configured to change a photographing mode to a simple photographing mode according to the estimated photographer.

6 Claims, 6 Drawing Sheets

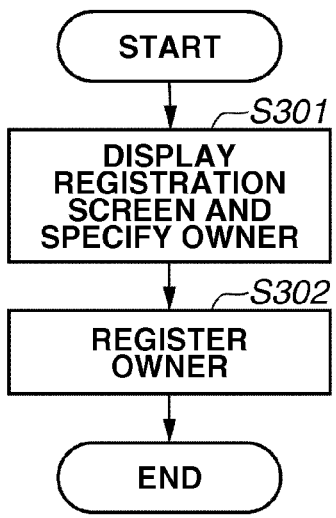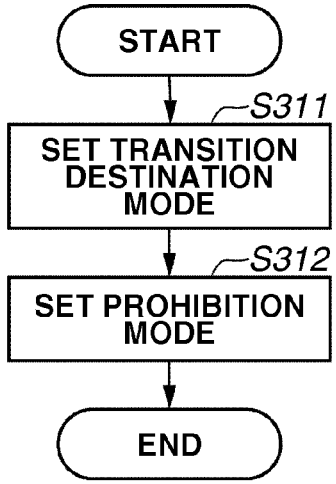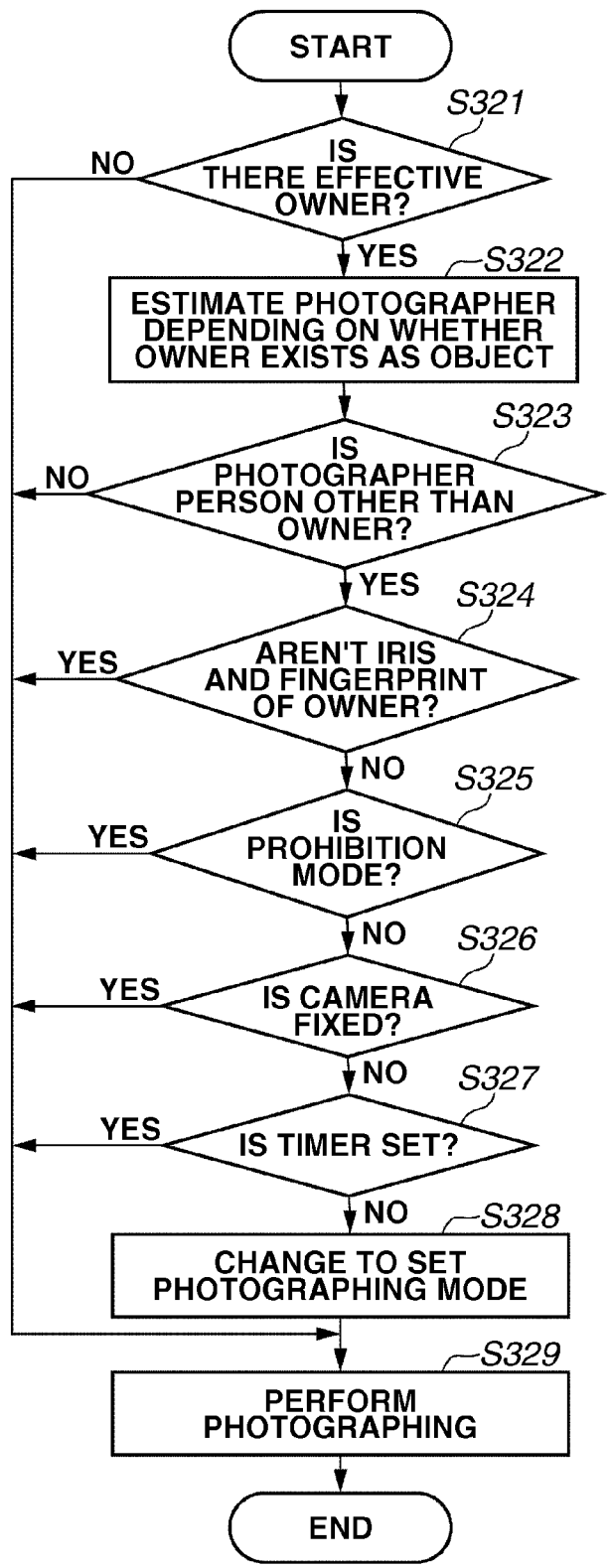

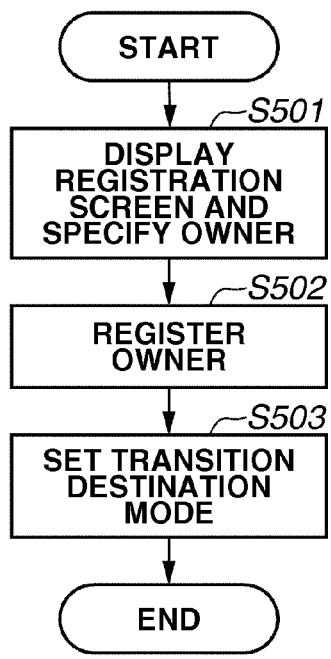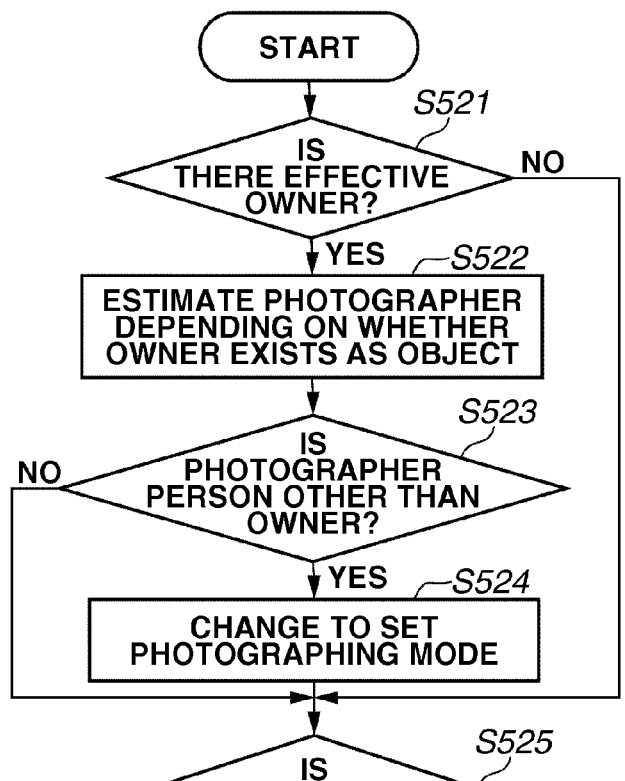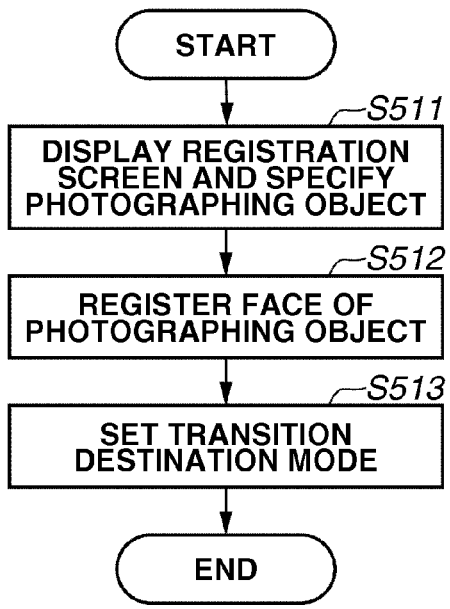

FIG.6A

| PERSONAL ID | EFFECTIVE FLAG | FINGERPRINT DATA ADDRESS | IRIS DATA ADDRESS | FACE DATA ADDRESS | TRANSITION DESTINATION MODE | PROHIBITION MODE | CONTINUOUS SHOOTING SETTING | ISO HIGH SENSITIVITY | IMAGE STABILIZATION | AUTOMATIC WIDE ANGLE |
|---|---|---|---|---|---|---|---|---|---|---|
| 1 | ○ | 0xCD000000 | 0xAE000000 | 0x88000000 | AUTO | NO | ON | ON | ON | ON |
| 2 | — | 0xCD001000 | 0xAE001000 | 0x88004000 | AUTO | Manual | ON | ON | ON | OFF |
| 3 | — | 0xCD002000 | 0xAE002000 | 0x88008000 | AUTO | NO | OFF | ON | ON | OFF |
| 4 | ○ | / | / | 0x88012000 | PERSON A | / | ON | ON | ON | ON |
| 5 | ○ | / | / | 0x88016000 | PERSON B | / | ON | ON | ON | OFF |

600 / 601 / 602 / 603 / 604 / 605 / 606 / 607 / 608 / 609 / 610

627 OWNER REGISTRATION AREA (IDs 1–3)
628 PHOTOGRAPHING OBJECT REGISTRATION AREA (IDs 4–5)

FIG.6B

| PERSONAL ID | FACE DATA ADDRESS | PHOTOGRAPHING SKILL |
|---|---|---|
| 1 | 0x88000000 | 1 |
| 2 | 0x88004000 | 2 |
| 3 | 0x88008000 | 3 |
| ⋮ | ⋮ | |

| PHOTOGRAPHING SKILL | TRANSITION DESTINATION MODE | ISO HIGH SENSITIVITY | IMAGE STABILIZATION | CONTINUOUS SHOOTING SETTING | AUTOMATIC WIDE ANGLE |
|---|---|---|---|---|---|
| 0 (DEFAULT) | AUTO | ON | ON | ON | ON |
| 1 | AUTO | ON | ON | ON | OFF |
| 2 | AUTO | ON | ON | OFF | OFF |
| 3 | PROGRAM | OFF | ON | OFF | OFF |
| 4 | NO CHANGE | OFF | OFF | OFF | OFF |

621 / 622 / 623 / 624 / 625 / 626

IMAGE CAPTURING APPARATUS AND METHOD FOR CONTROLLING THE SAME

BACKGROUND OF THE INVENTION

1. Field of the Invention

The present invention relates to control of photographing according to a photographer who operates an image capturing apparatus.

2. Description of the Related Art

Conventionally, when an owner of a digital camera requests a person in the neighborhood to perform photographing at a travel destination or the like, there may be the case that the person who has been requested cannot successfully operate the camera and cannot take an expected photograph. In a situation where an operator of the camera is thus changed, the person who has been requested hardly fails in photographing if the owner hands the camera thereto after setting the camera to a state ready for photographing.

For example, the owner may hand the camera to the person after setting the camera to an automatic mode. In such a photographing mode, the camera automatically sets each photographing parameter according to a scene. Therefore, the person who has been requested can simply perform proper photographing.

Even if the photographing mode is the automatic mode, however, the owner is to hand the camera to the person who has been requested after setting the camera to the appropriate mode once. If the owner forgets to set the camera, the person who has requested may fail in photographing. It is significantly troublesome for the owner to set a mode every time he or she requests the other person to perform photographing.

A digital camera that determines a photographer based on biometric information such as a retina and a fingerprint to perform function limitation according to the photographer has been known (see Japanese Patent Application Laid-Open No. 2002-057928). However, the digital camera discussed in Japanese Patent Application Laid-Open No. 2002-057928 needs to separately provide functions of registering and determining various types of biometric information. Therefore, the higher the accuracy of determination of the photographer and control of a photographing mode becomes, the higher the cost.

SUMMARY OF THE INVENTION

The present invention is directed to a technique capable of preventing failed photographing caused by a difference in photographers in a low-cost configuration without requiring time and labor to change setting of an image capturing apparatus.

According to an aspect of the present invention, an image capturing apparatus including an image capturing unit configured to obtain an image by image capturing includes a first storage unit configured to store face information of an owner of the image capturing apparatus, an estimation unit configured to estimate a photographer of the image capturing apparatus based on a relationship between an object included in the image obtained by the image capturing unit and the face information of the owner stored in the first storage unit, and a change unit configured to change a photographing mode to a simple photographing mode according to the estimated photographer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C illustrate a flow of processing executed by a digital camera according to a first exemplary embodiment.

FIGS. 5A to 5C illustrate a flow of processing executed by a digital camera according to a third exemplary embodiment.

FIGS. 6A to 6C illustrate an example of registration of an owner and a photographing object in the exemplary embodiment of the present invention.

DESCRIPTION OF THE EMBODIMENTS

Various exemplary embodiments, features, and aspects of the invention will be described in detail below with reference to the drawings.

Figure 1:
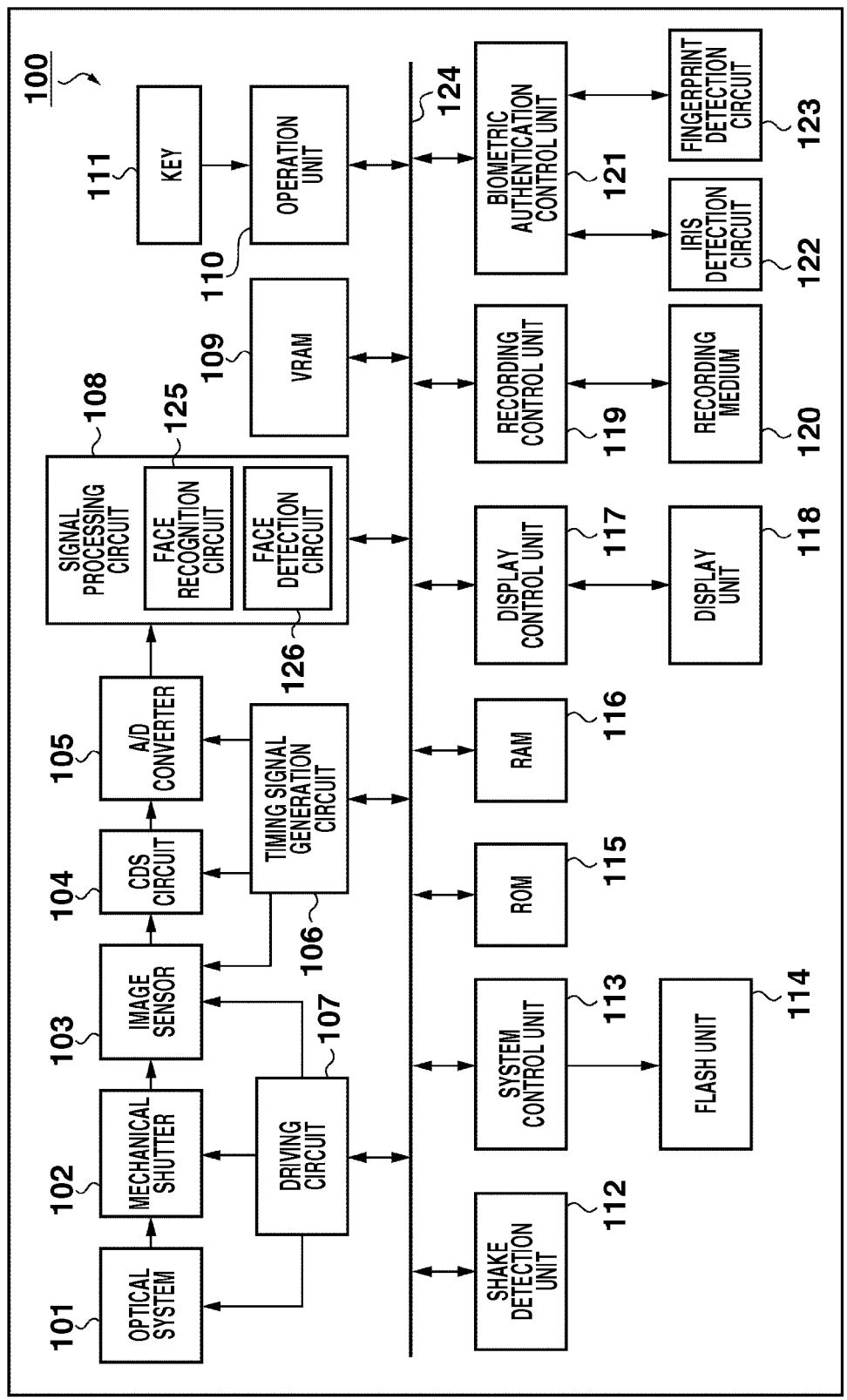
FIG. 1 illustrates a functional configuration of a digital camera according to an exemplary embodiment of the present invention.

Referring to FIG. 1, a functional configuration of a digital camera 100 according to a first exemplary embodiment will be described.

The digital camera 100 is provided with an optical system 101 which includes a zoom lens, a focus lens, and a diaphragm, a mechanical shutter 102, an image sensor 103, and a correlated double sampling (CDS) circuit 104 which performs analog signal processing. An analog-to-digital (A/D) converter 105 converts an analog signal to a digital signal. A timing signal generation circuit 106 generates signals for operating the image sensor 103, the CDS circuit 104, and the A/D converter 105.

A driving circuit 107 drives the optical system 101, the mechanical shutter 102, and the image sensor 103. A signal processing circuit 108 subjects image data of a photographed image to required signal processing, and includes a face recognition circuit 125 and a face detection circuit 126.

The face recognition circuit 126 detects a face of a person in a photographed image represented by the digital signal (i.e., image data) output by the A/D converter 105. The face recognition circuit 125 performs recognition processing (processing for recognizing an individual) for the face of the person detected by the face detection circuit 126. In order to reduce a time period required for face detection processing, the face detection circuit 126 may detect a face of a person in a photographed image represented by the image data resized to be smaller by the signal processing circuit 108.

A known face detecting technique can be used for the face detection in the present exemplary embodiment. The known face detecting method includes a method based on leaning using a neural network or the like, and a method for searching an image for a part having a characteristic shape such as an eye, a nose, and a mouth using template matching and taking the image as a face if the part has a high degree of similarity to the template. In addition thereto, a large number of methods such as a method for detecting amounts of image features such as the color of a skin and the shape of an eye and using statistical analysis have been discussed. Generally, a plurality of such methods is combined with each other to improve the accuracy of the face detection.

A known face recognizing technique can also be used for the face recognition in the present exemplary embodiment. For example, the face recognition circuit 125 can perform the face recognition processing by acquiring feature information relating to a feature of a face of an individual from a storage unit such as a read-only memory (ROM) 115 and comparing the feature information with feature information relating to a face of a person detected by the face detection circuit 126.

An image memory (video random access memory (VRAM)) 109 stores the image data that has been subjected to the signal processing by the signal processing circuit 108 and results of the face recognition processing and the face detection processing by the face recognition circuit 125 and the face detection circuit 126.

An operation unit 110 is used by a user to set a photographing condition and select a photographing mode or the like. A key 111 includes a plurality of keys. The operation unit 110 outputs an input signal corresponding to each setting and selection to a bus 124 in response to the operation of the key 111 or the like.

A system control unit 113 controls each operation of the digital camera 100. For example, the system control unit 113 controls a photographing operation for recording the image data output by the A/D converter 105 on a recording medium 120 via the processing by the signal processing circuit 108, and controls mode switching processing, which is described below, and setting and registration processing therefor.

The optical system 101 includes an image stabilizer (IS) lens for correcting a camera shake. A shake detection unit 112 including a vibration gyro can detect a shake of the digital camera 100. The driving circuit 107 drives the IS lens based on information fed from the shake detection circuit 112 to correct the camera shake. The digital camera 100 also includes a flash unit 114.

A nonvolatile memory (ROM) 115 stores a program executed by the system control unit 113, control data such as parameters and tables used when the program is executed, and correction data such as an address of defect. A volatile memory (RAM) 116 temporarily stores the program, the control data, and the correction data stored in the ROM 115, and is used as a work area when the system control unit 113 executes the program.

A display unit 118 such as a liquid crystal display displays image data. A display control unit 117 displays on the display unit 118 the image data that has been subjected to the signal processing by the signal processing circuit 108.

The recording medium 120 such as a memory card is detachably attached to the digital camera 100. A recording control unit 119 records on the recording medium 120 the image data that has been subjected to the signal processing by the signal processing circuit 108.

A biometric authentication control unit 121 controls an iris detection circuit 122 for detecting an iris and a fingerprint detection circuit 123 for detecting a fingerprint. The biometric authentication is generally performed by extracting and registering information referred to as a template in advance and comparing the information with information acquired by a sensor during the authentication. There are various types of systems such as a system for merely comparing images and a system for detecting a biological reaction. A system for comparing information with information acquired by a sensor during authentication is used in the present exemplary embodiment. The internal bus 124 enables communication among the control units.

Figure 2:
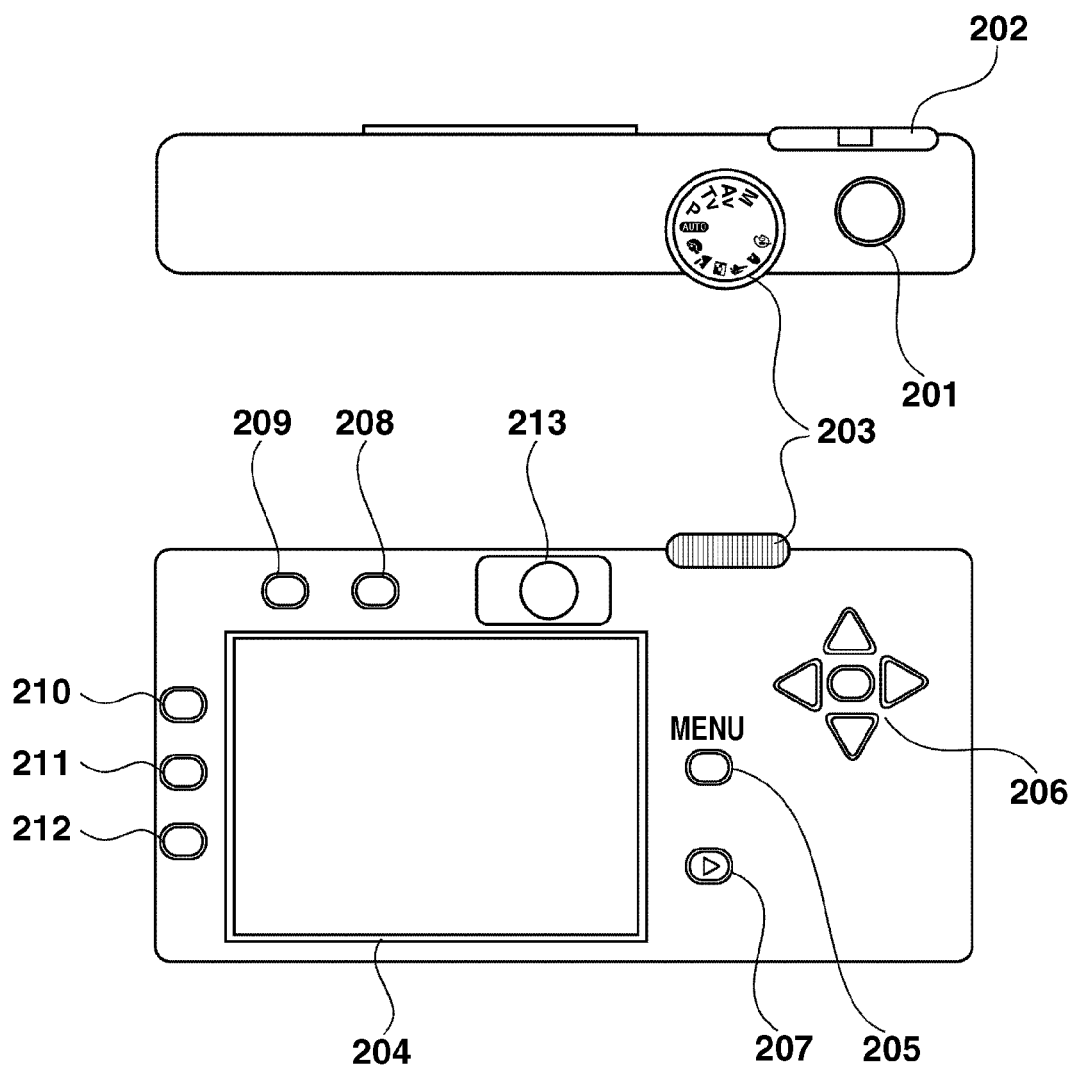
FIG. 2 illustrates an appearance of the digital camera according to the exemplary embodiment of the present invention.

FIG. 2 illustrates an appearance (an upper surface and a back surface) of the digital camera 100. Buttons illustrated in FIG. 2 constitute the key 111 and the operation unit 100 illustrated in FIG. 1. The user can lock a focus by half pressing a photographing button 201 and can give an instruction to start image capturing processing by further pressing the photographing button 201. The photographing button 201 also functions as the fingerprint detection circuit 123. A zoom button 202 can slide rightward and leftward, and the lens in the optical system 101 is adjusted according to the sliding, to implement desired zooming.

The user can give an instruction to perform an operation suitable for a scene to be photographed by rotating a mode dial 203. For example, the user can give instructions for a fully automatic mode, a portrait mode suitable for a person, a landscape mode suitable for a landscape, a sport mode suitable for photographing a fast moving object, and a night scene mode suitable for photographing in a dark place.

The display unit 118 has an appearance 204. A button 205 is used to display a menu on the display unit 118. The user can display the menu and perform various types of setting by pressing the button 205.

A button group 206 is used to operate the menu displayed on the display unit 118. The user can select an item to be operated from the displayed menu and input and select parameters by pressing the button group 206.

A button 207 is used to superimpose and display an image for assisting in photographing on the display unit 118 during photographing. Buttons 208 to 212 are used to quickly perform various types of operations such as flash setting and macro mode setting. These buttons also function as shortcut buttons for calling menu items displayed by the button 205 at one touch.

A finder 213 is used to confirm an object and to determine composition in photographing. The finder 213 also functions as the iris detection circuit 122.

FIGS. 3A to 3C illustrate flows of processing of the digital camera 100 according to the present exemplary embodiment. Each of steps in the processing is implemented by the system control unit 113 executing the processing or by the system control unit 113 controlling an operation of each block.

FIG. 3A illustrates the flow of processing for registering information relating to an owner. The owner in the present exemplary embodiment is not limited to a purchaser of the digital camera 100 or a person who actually has a history of frequently using the digital camera 100, but includes a person to be an object of registration work, described below.

The display control unit 117 displays a registration screen of the owner on the display unit 118 according to an operation of the button 205 by the user. A list of personal ID numbers respectively assigned to registered owners is displayed on the registration screen. In step S301, the system control unit 113 specifies a personal ID to be newly registered or to be changed its registered contents in response to the user selecting desired one of the personal ID numbers.

In step S302, the system control unit 113 registers information relating to the owner in the specified personal ID. The registered information includes a face image, a fingerprint, and an iris corresponding to the personal ID specified in step S301. Information relating to the face image, the fingerprint, and the iris are managed as address data on the ROM 115 as illustrated in FIG. 6A described below, and their actual data pieces are stored in an area other than the table.

The face image used for the registration is acquired by extracting a face image area from a photographed image. The extraction of the image area may be automatic extraction by face detection or manual extraction by a trimming operation performed by a user, or the like.

When photographing is performed according to a photographing instruction given by the user while the registration screen of the owner is displayed, a photographed image is stored in the VRAM 109. The signal processing circuit 108 extracts an image corresponding to a face area from the stored photographed image, and processes the extracted face area image to a size and an image quality suitable for face recognition. The system control unit 113 then records a face image in a predetermined area corresponding to a face data storage address on the ROM 115. Photographing does not need to be newly performed. An image, which has already been photographed in the past and stored in the recording medium 120 may be used.

The fingerprint registration is performed as follows. When a registering object person touches the photographing button 201 with his or her forefinger, the fingerprint detection circuit 123 detects a fingerprint in response to the touch, and the system control unit 113 records data of the detected fingerprint in a predetermined area corresponding to a fingerprint data storage address on the ROM 115.

The iris registration is performed when the iris detection circuit 122 detects an iris in response to a registering object looking into the finder 213, and the system control unit 113 records data of the detected iris in a predetermined area corresponding to an iris data storage address on the ROM 115. If the registering object registers the irises of both his or her eyes at this time, it can be detected that the user is a registered person by either one of the eyes.

FIG. 3B illustrates the flow of processing for setting a transition destination mode when the owner is recognized.

First, the display control unit 117 displays on the display unit 118 a mode setting screen to be changed according to an operation of the button 205 by the user. A list of reduced images of faces corresponding to respective personal IDs and settable modes among those are defined by the mode dial 203 is displayed on the setting screen. In response to that the user selects one reduced image from the reduced images of the faces of owners, the system control unit 113 specify the personal ID of the owner for which an automatic mode change during photographing is set effective.

If the reduced image corresponding to the personal ID "1" is selected, the system control unit 113 sets an effective flag 601 corresponding to the personal ID "1", as illustrated in FIG. 6A. Then, when the user selects one mode among the list of displayed modes, the system control unit 113 sets the selected mode as a transition destination mode 605. In step S311, the system control unit 113 records information about the set owner and mode in the table on the ROM 115.

A simple photographing mode in which an operation is automated referred to as an AUTO mode can be set as the transition destination mode 605. In the AUTO mode, the user does not need to directly adjust photographing parameters such as focus, exposure, and white balance (WB), and the system control unit 113 sets the parameters according to a scene.

Information referred to specify a scene by the system control unit 113 may include information input from a dedicated sensor and information obtained as a result of analyzing a photographed image. The AUTO mode may be an intelligent mode for determining a scene having a specific name. In the case, the system control unit 113 determines which of scene such as a person, a night scene, or a sport is an object using the above described information, and sets photographing parameters most suitable for photographing the object.

When the transition destination mode 605 is set, the presence or absence of continuous shooting setting 607, the presence or absence of International Standardization Organization (ISO) high sensitivity setting 608, the presence or absence of camera shake image stabilization 609, and the presence or absence of setting 610 for automatically moving a zoom at a wide angle can also be simultaneously set. These setting are set according to a user operation in the present exemplary embodiment, however, they may be automatically set in synchronization with mode setting.

Even if a mode transition condition is satisfied during photographing, a mode (prohibition mode) 606 for preventing transition to the mode set in step S311 is then set. The setting may be performed according to selection by the user from the modes displayed as the list. In step S312, the system control unit 113 records the set information in the prohibition mode 606 in the table on the ROM 115. A purpose and an effect of providing the prohibition mode 606 will be described below.

FIG. 6A illustrates an example of a configuration of the table recorded by the registration and setting processing illustrated in FIGS. 3A and 3B. As illustrated in FIG. 6A, a personal ID 600 is assigned for each user. The table includes two registration areas for control according to the personal ID 600. Areas 627 are used to register the above described "owner", and are assigned personal IDs "1" to "3". On the other hand, areas 628 are used to register a "photographing object", and are assigned personal IDs "4" and "5". Pieces of information about the personal IDs "4" and "5" are used to photograph the photographing object under a desired photographing condition. The details of the control will be described in a third exemplary embodiment.

In the personal IDs "1" to "3" serving as owner information, a fingerprint data storage address 602, an iris data storage address 603, and a face data storage address 604 are recorded for each personal ID. The transition destination mode 605 and the prohibition mode 606 are also recorded for each personal ID. Further, the presence or absence of the continuous shooting setting 607, the presence or absence of the ISO high sensitivity setting 608, the presence or absence of the camera shake image stabilization 609, and the presence or absence of the function 610 of automatically moving a zoom at a wide angle are recorded for each personal ID.

FIG. 3C illustrates the flow of processing in which the owner is determined during photographing. The digital camera 100 has already entered a state ready for photographing when the processing is started. The state ready for photographing means a state where the blocks 101 to 109 relating to the image capturing function are operated, and a current image obtained by the image sensor 103, i.e., alive view image is displayed on the display unit 118.

In step S321, the system control unit 113 first refers to the effective flag 601 in the table illustrated in FIG. 6A stored in the ROM 115 while the digital camera 100 is in the state ready for photographing, to determine whether the owners registered in the owner registration area 627 include an owner for which a mode change is set effective. If there is no effective owner (NO in step S321), the processing proceeds to step S329. If there is an effective owner (YES in step S321), the processing proceeds to step S322. If no owner is registered, the processing also proceeds to step S329.

In step S322, the system control unit 113 determines whether the face of the effective owner exists in an object in a photographed image used for live view display. The determination is made by comparing registered face information existing in the face data storage address 604 on the ROM 115 with a face image extracted from the face recognition circuit 125 and the face detection circuit 126 and recorded in the VRAM 109. In step S323, the system control unit 113 estimates who is a photographer of the digital camera 100 using its determination result.

If the registered owner does not exist in the object, the system control unit 113 estimates that the photographer of the digital camera 100 is the owner (NO in step S323), and the processing proceeds to step S329 upon receipt of its estimation result. If the owner exists in the object, the system control unit 113 estimates that the photographer of the digital camera 100 is a person other than the owner (YES in step S323), and the processing proceeds to step S324 upon receipt of its estimation result. Considering a physical relationship with a housing of the digital camera 100, it is clear that the owner does not contact the camera and cannot operate the camera.

In step S324, the system control unit 113 confirms the estimation result that the photographer in step S322 is not the owner using determination by iris and fingerprint authentication. In the fingerprint authentication, the system control unit 113 reads out data of the fingerprint of the owner determined in step S322 from the ROM 115. The system control unit 113 compares the fingerprint data detected by the fingerprint detection circuit 123 in an operation of the photographing button 201 by the user at the present time with the fingerprint data of the owner recorded on the ROM 115.

Similarly, in the iris authentication, the system control unit 113 reads out data of the iris of the owner determined in step S322 from the ROM 115. The system control unit 113 compares the iris data detected by the iris detection circuit 122 in the use of the finder 213 by the user at the present time with the iris data of the owner recorded on the ROM 115.

If it is determined that the fingerprint and the iris are not of the owner by the fingerprint and iris authentication (NO in step S324), the processing proceeds to step S325, considering that the estimation is accurate. On the other hand, if it is determined that the fingerprint and the iris are of the owner (YES in step S324), the processing proceeds to step S329, considering that the estimation is not accurate.

In step S325, the system control unit 113 then determines whether the currently set photographing mode is the prohibition mode 606. The determination here is made by reading out a set value of the prohibition mode 606 corresponding to the personal ID 600 identified as the object from the ROM 115.

If the prohibition mode 606 is set, for example, the prohibition mode corresponds to the personal ID "2" as a result of the determination (YES in step S325), the processing proceeds to step S329. On the other hand, if the prohibition mode 606 is not set, for example, the prohibition mode corresponds to the personal ID "1" or "3" (NO in step S325), the processing proceeds to step S326.

The prohibition mode 606 is provided because it may be desired to take photographing in a single photographing mode more important than avoiding failing in photographing. More specifically, when the owner assigned the personal ID "2" is taken as an example, an automatic change of the photographing mode is prohibited in a manual mode. In this case, if the owner sets a mode other than the manual mode, a mode change is executed when photographing is left to others. If the owner sets the manual mode, photographing in the manual mode is continued even if the photographing is left to others. Accordingly, unified photographing in the manual mode can be continued as long as the photographing mode is set to the manual mode.

In step S326, the system control unit 113 then determines whether the digital camera 100 is fixed. If the digital camera 100 is fixed to a tripod, for example, a situation where photographing is automatically performed under setting of the owner can be considered so that the possibility of failing in photographing is low. If the system control unit 113 determines that the digital camera 100 is fixed (YES in step S326), the processing proceeds to step S329 without making any mode change.

In step S326, if the shake detection unit 112 determines that there is no shake, the system control unit 113 determines that the digital camera 100 is fixed (YES in step S326), and the processing proceeds to step S329. If not (NO in step S326), the processing proceeds to step S327.

In step S327, the system control unit 113 determines whether an internal timer during photographing is set. If the internal timer is set, it is determined that the digital camera 100 is fixed, like in step S326, considering from the use of the timer. The setting of the internal timer is performed by the menu button 205 or the like before photographing, and is recorded in the RAM 116. If the internal timer during photographing is set (YES in step S327), the processing proceeds to step S329. If the internal timer is not set (NO in step S327), the processing proceeds to step S328.

In step S328, the photographer is a person other than the owner, and the digital camera 100 is in a state suitable for changing the photographing mode. Therefore, the system control unit 113 temporarily changes mode setting information stored in an internal register without changing the state of the mode dial 203.

The system control unit 113 changes the photographing mode according to information about the transition destination mode 605 corresponding to the personal ID 600 illustrated in FIG. 6. The system control unit 113 changes the setting according to setting information including the presence or absence of the continuous shooting setting 607, the presence or absence of the ISO high sensitivity setting 608, the presence or absence of the image stabilization 609, and the presence or absence of the setting 610 for automatically moving a zoom to a wide angle. The system control unit 113 controls the driving circuit 107 and the signal processing circuit 108 according to various types of changed parameters.

In step S329, the system control unit 113 controls photographing according to the set photographing mode (e.g., AUTO mode). More specifically, the system control unit 113 controls the mechanical shutter 102 to cause the image sensor 103 to acquire a photographed image, controls the CDS circuit 104, the A/D converter 105, and the signal processing circuit 108 to record the image on the VRAM 109, and store the image in the recording medium 120 via the recording control unit 119.

As described above, according to the present exemplary embodiment, the photographer of the digital camera 100 is estimated as a person other than the owner and the photographing mode is automatically changed to a previously set simple photographing mode or the like. Therefore, the photographer can perform photographing simply and with little failure if he or she is unaccustomed to photographing.

Particularly, the present exemplary embodiment is characterized in that a photographer is estimated using an object recognition result from a photographed image. More specifically, if estimation of the photographer is performed with high accuracy by biometric detection such as fingerprint and iris detection, a high-cost detection circuit and a dedicated operation member are required. On the other hand, in the present exemplary embodiment, a photographer can be estimated by a logical relationship between an object included in a photographed image and registered information. Therefore, the photographer can be reliably estimated in a simpler configuration.

In the above described exemplary embodiment, one owner is determined from an image to be controlled. However, a plurality of owners may be simultaneously determined and controlled. For example, there is a case that the effective flag 601 illustrated in FIG. 6A is set for both personal IDs "1" and "2".

In this case, in step S322, the system control unit 113 estimates that the photographer as a person other than the owners, when the faces of both the owners assigned the personal IDs "1" and "2" are included in an image.

In step S324, the system control unit 113 determines that the estimation is accurate, if the photographer is not matched with biometric information about both the owners assigned the personal IDs "1" and "2". Further in step S325, if the prohibition mode 606 is set in either one of the personal IDs "1" and "2", the system control unit 113 prohibits a mode change based on the setting.

If the digital camera 100 is configured as described above, a similar effect to that in the first exemplary embodiment can be obtained even if the digital camera 100 is simultaneously shared among the plurality of owners.

As a second exemplary embodiment, processing corresponding to photographing skills of a plurality of owners will be described. A functional configuration of a digital camera in the present exemplary embodiment is a configuration excluding the iris detection circuit 122 and the fingerprint detection circuit 123 from the functional configuration of the digital camera 100 according to the first exemplary embodiment illustrated in FIG. 1. An appearance (an upper surface and a back surface) of a digital camera 100 according to the present exemplary embodiment is similar to that in the first exemplary embodiment.

Figure 4A:
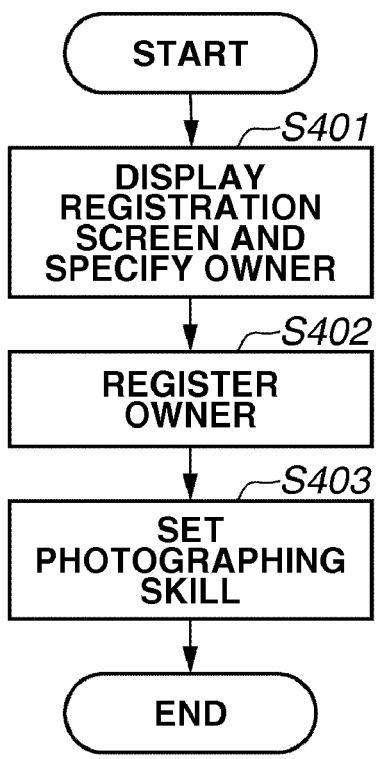
FIGS. 4A and 4B illustrate a flow of processing executed by a digital camera according to a second exemplary embodiment.
Figure 4B:
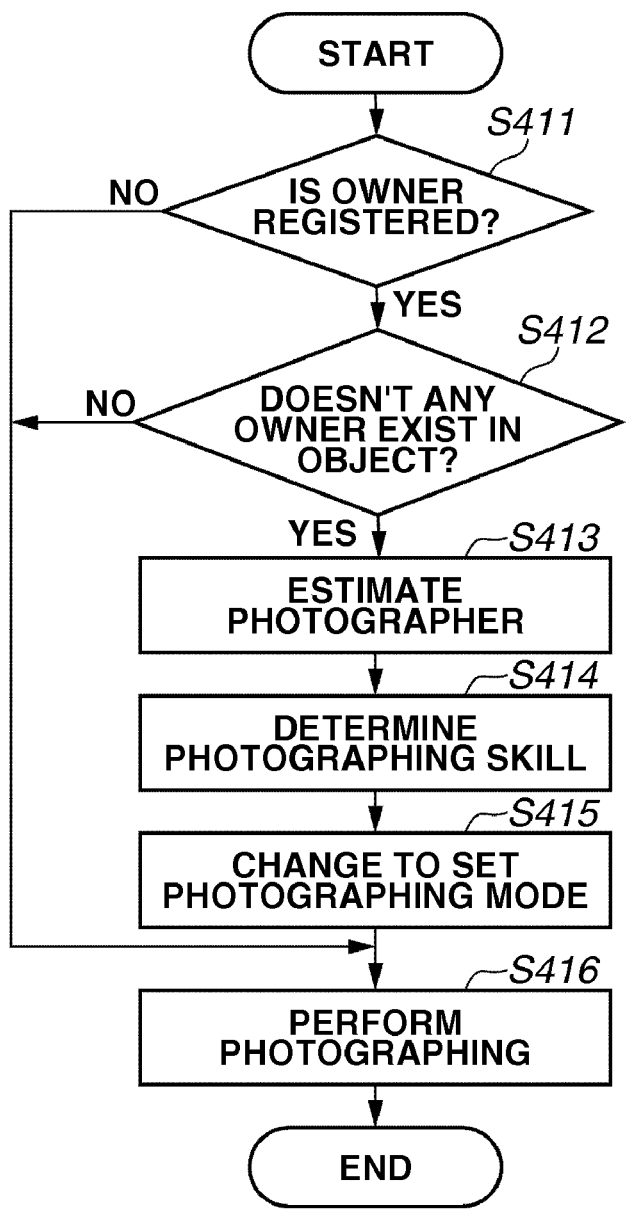

FIGS. 4A and 4B illustrate the flows of processing of the digital camera 100 according to the present exemplary embodiment. Each of steps in the processing is implemented by the system control unit 113 executing the processing or by the system control unit 113 controlling an operation of each block.

FIG. 4A illustrates the flow of processing for registering information about the owner in the digital camera 100.

Processing in steps S401 and S402 are respectively similar to the processing in steps S301 and S302 in the first exemplary embodiment. The processing relating to the iris detection and the fingerprint detection are not performed in the present exemplary embodiment.

In step S403, the system control unit 113 sets a photographing skill of the owner. In the setting, a display control unit 117 first displays a registration screen on a display unit 118. In response to an input or selection by a user of a photographing skill corresponding to a specified personal ID, the system control unit 113 sets the input or selected value in a table on a ROM 115.

FIG. 6B illustrates a configuration of the table recorded by registration and setting processing illustrated in FIG. 4B. In FIG. 6B, a personal ID 611 is assigned for each registered owner. A face data storage address 612 is also recorded. In the present exemplary embodiment, a photographing skill 613 of the owner is recorded. The larger the number of the photographing skill of the owner, the higher the photographing skill.

If the digital camera 100 is shared among family members, for example, a father who is accustomed to using the camera can be assigned to a personal ID "3", a mother who sometimes uses the camera can be assigned to a personal ID "2", and a child who has hardly used the camera can be assigned to a personal ID "1".

FIG. 4B illustrates the flow of processing in which the owner is determined during photographing. It is assumed that the digital camera 100 has already entered a state ready for photographing when the processing is started, similar to the first exemplary embodiment.

In step S411, the system control unit 113 first determines whether the owner is registered in the ROM 115 in the state ready for photographing. If the owner is not registered (NO in step S411), the processing proceeds to step S416. If the owner is registered (YES in step S411), the processing proceeds to step S412.

In step S412, the system control unit 113 determines whether the face of the registered owner exists in an object in a photographed image used for live view display. The determination is made by comparing registered face information existing in a face data storage address 612 on the ROM 115 with a face image extracted from a face recognition circuit 125 and a face detection circuit 126 and recorded in the VRAM 109. If no registered owner exists in the object as a result of the determination (NO in step S412), the processing proceeds to step S416. If at least one owner exists (YES in step S412), the processing proceeds to step S413.

In step S413, the system control unit 113 estimates a photographer. If the owners assigned the personal IDs 611 "2" and "3" exist as objects, for example, the owner assigned the personal ID 611 "1" is estimated as the photographer. If the owner assigned the personal ID 611 "3" exists as an object, for example, the owner assigned the personal ID 611 "1" or "2" is estimated as the photographer. If all persons registered in the personal ID 611 exist as objects, the photographer is estimated as a person other than the owners.

In step S414, the system control unit 113 determines the skill of the photographer according to information about the photographer estimated in step S413. If the photographer is estimated as one of the owner in step S413, a photographing skill 613 corresponding to the personal ID assigned to the owner is selected from FIG. 6B. If the photographer is the owner assigned the personal ID 611 "1", for example, the photographing skill thereof is set to "1". If the photographer is estimated as a person other than the owners, the photographing skill thereof is set to a default. If the photographer is estimated as any one of the plurality of owners, the photographing skill 613 of the owner having the lowest photographing skill among the plurality of owners is selected from FIG. 6B. If the photographer is estimated as the owner assigned the personal ID 611 "1" or "2", for example, the photographing skill "1" corresponding to the personal ID 611 "1" is set.

In step S415, a mode is set according to the photographing skill set in step S414. FIG. 6C illustrates an example of modes and photographing parameters set for each photographing skill. A photographing skill 621 includes stages "0" to "4", and the photographing skill set by default is "0". A transition destination mode 622, the presence or absence of ISO high sensitivity setting 623, the presence or absence of camera shake image stabilization 624, the presence or absence of continuous shooting setting 625, and the presence or absence of setting 626 for automatically changing a zoom to a wide angle are set for each photographing skill. The system control unit 113 temporarily changes mode setting information stored in an internal register without changing the state of a mode dial 203.

In step S416, the system control unit 113 controls photographing according to a set photographing mode (AUTO mode, etc.) and photographing parameters, like in the first exemplary embodiment.

As described above, according to the present exemplary embodiment, the digital camera 100 can estimate a photographer from information about an owner registered in the digital camera 100 and a photographed image, and automatically change a photographing mode to an optimum photographing mode according to its estimation result. Therefore, photographing can be performed with little failure under a photographing mode most suitable for a photographing skill of the photographer. This is particularly effective when photographing is performed by changing a photographer in a group of owners such as family members that greatly differ in photographing skills.

As a third exemplary embodiment, processing according to information about a previously registered owner and a photographing object will be described. A functional configuration of a digital camera in the present exemplary embodiment is a configuration excluding the iris detection circuit 122 and the fingerprint detection circuit 123 from the functional configuration of the digital camera 100 according to the first exemplary embodiment illustrated in FIG. 1. An appearance (an upper surface and a back surface) of a digital camera 100 according to the present exemplary embodiment is similar to that in the first exemplary embodiment.

FIGS. 5A to 5C illustrate the flows of processing of the digital camera 100 according to the present exemplary embodiment. Each of steps in the processing is implemented by the system control unit 113 executing the processing or by the system control unit 113 controlling an operation of each block.

FIG. 5A illustrates the flow of processing for registering information about the owner in the digital camera 100 and processing for setting a transition destination mode.

Processing in steps S501, S502, and S503 are respectively similar to the processing in steps S301, S302, and S311 in the first exemplary embodiment. The processing relating to the iris detection and the fingerprint detection are not performed in the present exemplary embodiment.

FIG. 5B illustrates the flow of processing for registering the photographing object in the digital camera 100. First, a display control unit 117 displays a registration screen of the photographing object on a display unit 118 according to an operation of a button 205 by a user. A list of personal ID numbers respectively assigned to photographing objects is displayed on the registration screen. In step S511, in response to that the user selects desired ID from the personal ID numbers, the system control unit 113 specifies a personal ID to be newly registered or to be changed its registered content.

In step S512, the system control unit 113 registers information about the photographing object in the specified personal ID. Information to be registered here is a face image corresponding to the personal ID specified in step S511. The information about the face image is managed as address data on the ROM 115 as illustrated in FIG. 6A, and its actual data is stored in an area other than a table. A specific method for acquiring and generating the face image used for the registration is similar to those in the first and second exemplary embodiments.

In step S513, the system control unit 113 performs processing for setting a transition destination mode. Processing similar to the mode setting processing in step S311 for the owner in the first exemplary embodiment is performed for the photographing object.

If a reduced image corresponding to a personal ID "4" is selected, the system control unit 113 sets an effective flag 601 corresponding to the personal ID "4", as illustrated in FIG. 6A. Then, when the user selects one mode among the list of displayed modes, the system control unit 113 sets the selected mode as a transition destination mode 605. In step S311, the system control unit 113 records information about the set owner and mode in the table on the ROM 115.

In FIG. 6A, a "person A" is set as the transition destination mode 605. In the present exemplary embodiment, specific photographing parameters representing a photographing mode include focus, a white balance, sharpness, color saturation, contrast, and a filter. They may be other photographing parameters. When the transition destination mode 605 is set, the presence or absence of continuous shooting setting 607, the presence or absence of International Standardization Organization (ISO) high sensitivity setting 608, the presence or absence of camera shake image stabilization 609, and the presence or absence of setting 610 for automatically moving a zoom at a wide angle can also be simultaneously set.

FIG. 5C illustrates the flow of processing in which an owner and an object are determined. It is assumed that the digital camera 100 has already entered a state ready for photographing when the processing is started, similar to the first and second exemplary embodiments.

Processing in steps S521, S522, S523, and S524 are respectively similar to the processing in steps S321, S322, S323, and S328 in the first exemplary embodiment.

In step S525, the system control unit 113 then determines whether the photographing object is registered in the ROM 115 in step S512. If the photographing object is not registered (NO in step S525), the processing proceeds to step S528. In step S528, the system control unit 113 controls a photographing operation, like in step S329 in the first exemplary embodiment. On the other hand, if the photographing object is registered (YES in step S525), the processing proceeds to step S526.

In step S526, the system control unit 113 determines whether the registered photographing object includes a photographing object for which the effective flag 601 is set. The determination is made by comparing information about the face of the photographing object registered in the ROM 115 with a face image extracted from a face recognition circuit 125 or a face detection circuit 126 and recorded in a VRAM 109, like in step S522. In the present exemplary embodiment, face images corresponding to personal IDs "4" and "5" illustrated in FIG. 6A are used. If the photographing object does not exist as a result of the determination (NO in step S526), the processing proceeds to step S528.

If the photographing object exists (YES in step S526), the processing proceeds to step S527. In step S527, the system control unit 113 shifts the photographing mode to a photographing mode for photographing the photographing object most suitably. The photographing mode is the transition destination mode 605 corresponding to the photographing object. Accordingly, even if a photographing mode corresponding to an estimated photographer is set, the photographing mode is preferentially set to the photographing mode corresponding to the photographing object included in the photographed image.

In step S528, the system control unit 113 controls photographing according to a set photographing mode (AUTO mode, etc.) and photographing parameters, like in the first and second exemplary embodiments.

As described above, according to the present exemplary embodiment, the digital camera 100 can determine that photographing is performed by an operator who is not an owner of the digital camera 100, and automatically change a photographing mode to a simple photographing mode or the like. Before changing the mode, if a photographing object is registered, photographing is performed in a photographing mode most suitable for the photographing object. Accordingly, mode setting suitable for a photographer and mode setting suitable for the photographing object can be dynamically changed according to a state of an object, so that photographing along the intension of the owner can be realized.

In the first to third exemplary embodiments, a predetermined photographing mode is changed to a predetermined mode based on a photographed image. However, a mode change by a photographer after the change is not particularly prohibited. In other words, the photographer can change a mode on a voluntary basis.

This point may be improved, to prohibit a voluntary change by a photographer for the photographing conditions 605 and 607 to 610 illustrated in FIG. 6A after a mode change and while an owner is included in an object, for example. More specifically, input to the key 111 and the operation unit 110 may be invalidated, or a warning may be issued after the input.

The functions in the above described exemplary embodiments can be provided by firmware of a digital camera.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-211978 filed Sep. 14, 2009, which is hereby incorporated by reference herein in its entirety.

What is claimed is:

1. An image capturing apparatus which includes an image capturing unit configured to obtain an image by image capturing, the image capturing apparatus comprising:
  a first storage unit configured to store face information of an owner of the image capturing apparatus;
  an estimation unit configured to estimate a photographer of the image capturing apparatus based on a relationship between an object included in the image obtained by the image capturing unit and the face information of the owner stored in the first storage unit; and
  a change unit configured to change a photographing mode to a simple photographing mode according to the estimated photographer,
  wherein the first storage unit stores face information of a plurality of the owners, when the object included in the image is at least one of the stored owners, the estimation unit estimates that the photographer is a person other than the at least one owner, and the change unit changes the photographing mode to a simple photographing mode corresponding to the person other than the at least one owner.

2. The image capturing apparatus according to claim 1, wherein when the object included in the image is the stored owner, the estimation unit estimates that the photographer is a person other than the owner, and the change unit changes the photographing mode to the simple photographing mode.

3. The image capturing apparatus according to claim 1, further including
  a second storage unit configured to store information about a photographing mode corresponding to face information of a photographing object,
  wherein when the image includes the photographing object, the change unit changes the photographing mode to a photographing mode corresponding to the photographing object prior to changing the photographic mode to the simple photographing mode corresponding to an estimated result.

4. The image capturing apparatus according to claim 1, wherein the first storage unit includes information about faces of a plurality of owners and information about respective photographing skills of the owners, when the object included in the image is at least one of the stored owners, the estimation unit estimates that the photographer is the owner other than the at least one owner, and the change unit changes the photographing mode to a simple photographing mode corresponding to the photographing skill of the other owner.

5. The image capturing apparatus according to claim 1, further comprising:
  a biometric authentication control unit configured to control biometric authentication according to at least one of iris detection and fingerprint detection for a photographer of the image capturing apparatus; and
  a determination unit configured to determine accuracy of a result of estimation of the photographer based on a result of control by the biometric authentication control unit.

6. A method for controlling an image capturing apparatus which includes an image capturing unit configured to obtain an image by image capturing, the method comprising:
  estimating a photographer of the image capturing apparatus based on a relationship between an object included in the image obtained by the image capturing unit and face information of an owner stored in a first storage unit; and
  changing a photographing mode to a simple photographing mode according to the estimated photographer,
  wherein the first storage unit stores face information of a plurality of the owners, when the object included in the image is at least one of the stored owners, estimating that the photographer is a person other than the at least one owner, and changing the photographing mode to a simple photographing mode corresponding to the person other than the at least one owner.

* * * * *